Aug. 15, 1950      W. S. CHENAULT      2,519,177
APPARATUS FOR COATING CYLINDRICAL VESSELS

Filed March 2, 1949      2 Sheets-Sheet 1

INVENTOR.
Woodford Sidney Chenault
BY
Griswold & Burdick
ATTORNEYS

Aug. 15, 1950 — W. S. CHENAULT — 2,519,177
APPARATUS FOR COATING CYLINDRICAL VESSELS
Filed March 2, 1949 — 2 Sheets-Sheet 2

INVENTOR.
Woodford Sidney Chenault
BY
Griswold & Burdick
ATTORNEYS

Patented Aug. 15, 1950

2,519,177

UNITED STATES PATENT OFFICE 2,519,177

APPARATUS FOR COATING CYLINDRICAL VESSELS

Woodford Sidney Chenault, Freeport, Tex., assignor to The Dow Chemical Company, Midland, Mich., a corporation of Delaware Application March 2, 1949, Serial No. 79,236

4 Claims. (Cl. 91—45)

The invention relates to apparatus for coating cylindrical vessels. More particularly, the invention relates to an apparatus by which cylindrical drums of the type conventionally used for shipping various types of liquid and solid products, as, for example, the standard sheet metal 55-gallon drum, may be spray-painted while fully loaded and ready for shipment.

One of the objects of the invention is to provide an apparatus by which fully loaded sheet metal cylindrical shipping containers may be painted on all the exposed surfaces of the container while the drum is in the upright position. Other objects and advantages will become apparent from the following specification and accompanying drawing.

In the said drawing.

In the drawings like numerals designate like parts.

Figure 1:
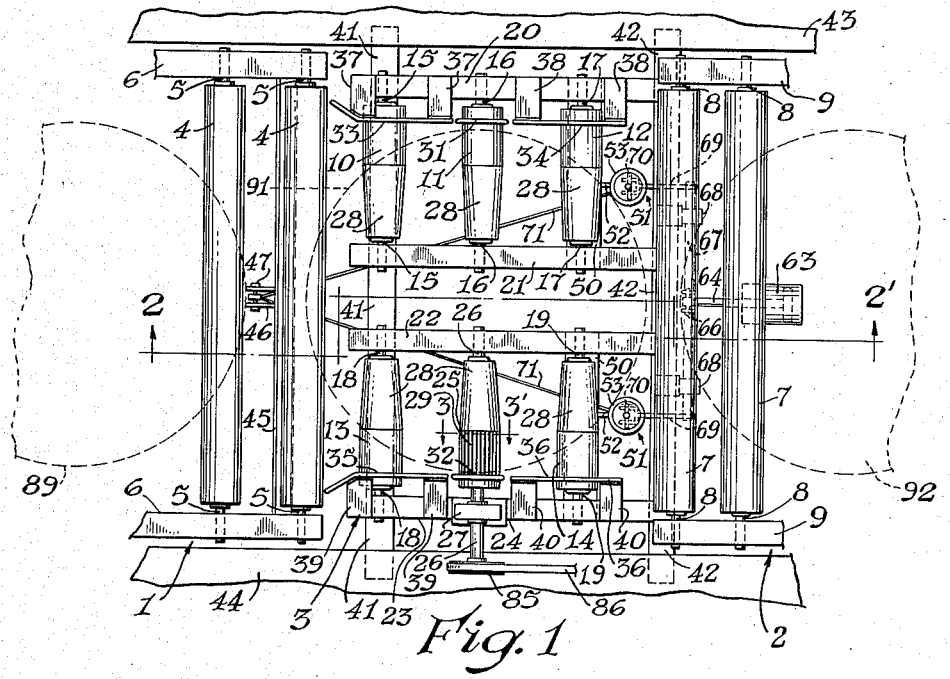
Fig. 1 is a plan view of a portion of the apparatus embodying the principles of the invention, the apparatus comprising a turntable mechanism on which containers are supported while being coated and portions of adjacent conveyors by which the containers are brought to and removed from the turntable.

As shown in the drawings, conveyors indicated generally by numerals 1 and 2 are provided at the entrance side and exit side respectively of the turntable mechanism, indicated generally by numeral 3.

Conveyor 1 comprises a plurality of parallel rollers 4 mounted on spindles 5 which are journalled in side rails 6. Conveyor 2 is of similar construction and comprises a plurality of rollers 7 mounted on spindles 8 which are journalled in side rails 9.

Referring to the turntable mechanism 3 (best shown in Fig. 1), this will be seen to comprise the free turning rollers 10, 11, 12, 13, and 14 mounted on spindles 15, 16, 17, 18, and 19, respectively. Spindles 15, 16, and 17 are journalled in side rails 20 and 21; spindles 18 and 19 are journalled in side rails 22 and 23, respectively. Between rollers 13 and 14 is mounted the driving roller 25 mounted on spindle 26, one end of which is journalled in side rail 22, the other in bearing 27 located on recessed portion 24 of side rail 23.

Figure 3:
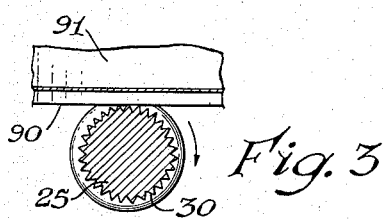
Fig. 3 is a sectional elevation on the line 3—3' of Fig. 1.

Each of the rollers 10, 11, 12, 13, and 14 and the driving roller 25 is provided with a tapered portion 28 on the inward end. The surface of the cylindrical portion 29 of roller 25 is provided with longitudinal serrations 30, as shown in greater detail in Fig. 3. Roller 11 and driving roller 25 are provided with a flange 31 and 32, respectively, near the outer end. Guides 33 and 34, in line with the plane of the flange 31, and guides 35 and 36, in line with the plane of the flange 32, are provided above and near the outer ends of the rollers.

Guide 33 is carried by brackets 37 attached to side rail 20. Guide 34 is carried by brackets 38 attached to side rail 20. Guides 35 and 36 are similarly mounted on side rail 23 by the pairs of brackets 39 and 40, respectively.

Side rails 20 and 21 are supported by cross members 41 and 42, which also support side rails 22 and 23. The cross members 41 and 42 are supported as by the concrete foundations 43 and 44.

Carried by the conveyor 1 is the cross member 45 on which is mounted the bracket 46. Bracket 46 supports the pivot 47 which carries the swinging stop member 48 having its upper end 49, when in the vertical position, extending above the top of rollers 4.

Cross members 50, carried by side rails 20 and 21; and 22 and 23, respectively, support a pair of identical stop members 51 which are attached to the cross member by brackets 52. As shown in greater detail in Fig. 4, each of these stop members has a rotatable head portion 53 mounted upon the upper end 54 of the spindle 55; a cotter pin 56 inserted in the hole 57 serves to retain the head portion on the spindle. The spindle is capable of limited vertical movement in the guides 58 and 59 which are held by the bracket 52. A pin 60 inserted in hole 61 in spindle 55 serves as a stop limiting the upward travel of the spindle and as a retainer for compression spring 62, one end of which abuts against guide 59 and the other against the pin 60. The spring thus constantly urges upwardly the spindle 55.

For actuating the stop members, the differential motor 63 is provided. Its piston rod 64 is linked to the two stop members 51. As shown, this linkage is composed of a crank 65, one end of which is slotted to receive the pin 66 in the piston rod 64. The other end of the crank 65 is attached to the shaft 67 carried by brackets 68 on cross member 42. Attached to the ends of shaft 67 are cranks 69, the slotted outer ends of which engage pins 70 in the lower ends of spindles 55. Each of the lower ends of spindles 55 is connected by a flexible cable 71 running through pulleys 72 to the lower end of the swinging stop member 48 so that movement of piston rod 64 into differential motor 63 raises spindle 55 and pulls the cord 71, thereby swinging the stop member 48 toward or into the vertical position. Outward motion of piston rod 64 moves spindle 55 downward and allows stop member to tilt as shown in dotted outline.

Figure 5:
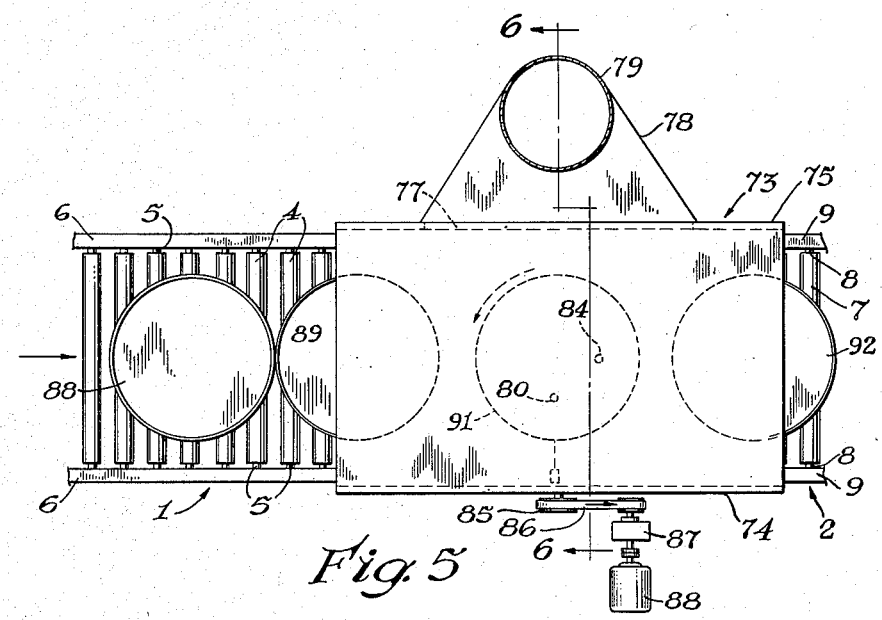
Fig. 5 is a plan view of the apparatus partially covered by a spray-catching chamber.
Figures 4, 6:
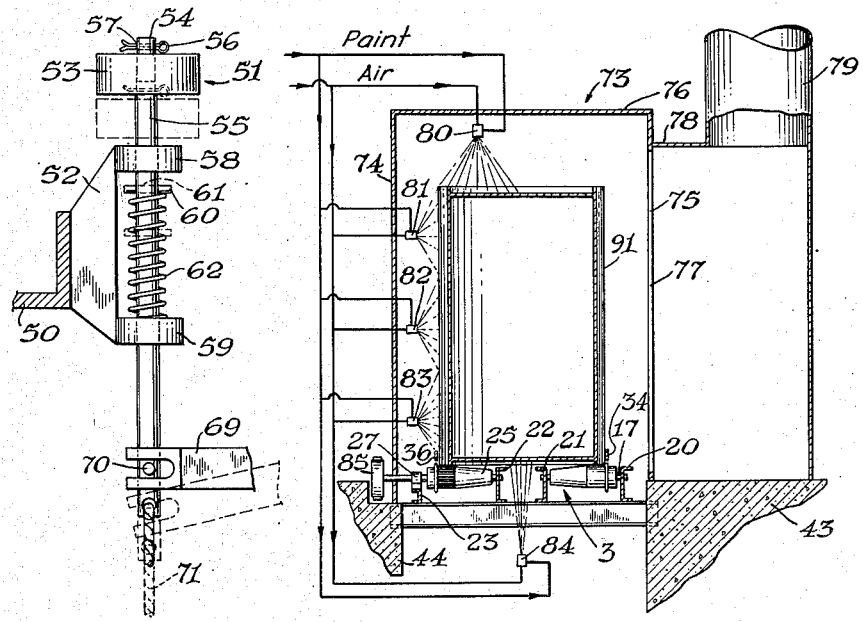
Fig. 4 is an enlarged view of a portion of one of the stop devices.
Fig. 6 is a sectional end elevation on the line 6—6' of Fig. 5 and shows schematically an arrangement of spray nozzles and piping and a container in position for spray coating.

More particularly referring to Figs. 5 and 6, there is shown the spray booth, indicated generally by numeral 73, which is arranged to enclose the spray-coating space provided over the turntable 3 and a portion of the two conveyors 1 and 2. As shown, the spray booth 73 is provided with side walls 74 and 75, one on each side of the turntable 3. The top edges of the walls support the roof section 76. An opening 77 is provided in wall 75, the opening being connected by a duct 78 to the vent stack 79. The lower end of the stack rests upon the foundation 43. The ends of the booth are open.

Suitable spray heads 80, 81, 82, 83, and 84 may be provided, as shown in Fig. 6, so as to direct the coating material onto the surfaces of the container to be coated, one such container being shown in dotted outline on the turntable.

Figure 2:
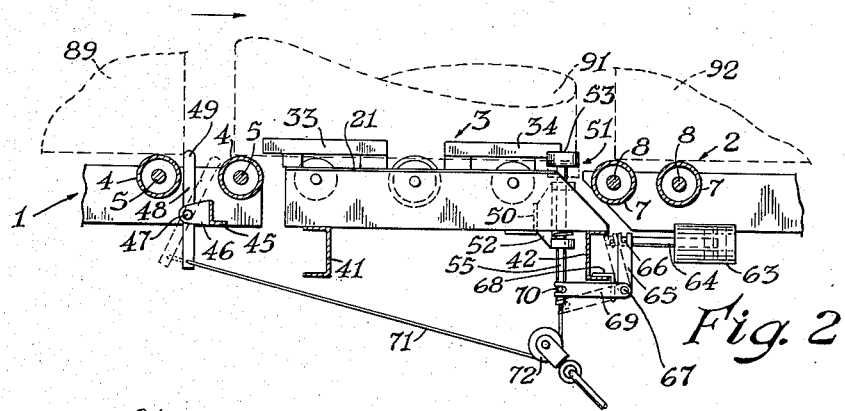
Fig. 2 is a sectional elevation of the turntable and portions of the adjacent conveyors on the line 2—2 of Fig. 1, showing the mechanism for releasing a coated container from the turntable and permitting movement of an uncoated container from the adjacent conveyor onto the turntable.

In operation the cylindrical vessels to be coated are placed upright upon the feeding conveyor 1 as shown at 89, Fig. 2, the bottom of vessel 89 abutting against the head 49 of the swinging stop member 48 (Fig. 2), which is initially in the upright position. When spray-coating the vessels is to take place, each one is led in turn onto the turntable by swinging the stop member 48 out of the way by operating the differential motor 63 so as to cause the piston rod 64 to move outwardly a sufficient distance. This movement of the piston rod lowers the spindles 55 and thus allows the cords 71 to release the stop 48. As soon as the bottom of the vessel has passed the stop member 48, the top 49 is brought into the upright position again to act as a stop preventing the next vessel (88) on the conveyor 1 from passing toward the turntable. At the same time the same movement of the piston rod 64 raises the spindle 55, causing the rotatable head 53 to project above the level of the rollers of the turntable 3 and thereby act as a stop to retain on the turntable the vessel released from behind the stop 48. Roller 25 is revolved by suitable driving means, such as pulley 85, which is attached to the shaft 26, the pulley being belted by belt 86 to the reduction gear 87 driven by motor 88. The serrated surface 30 of the roller 25 engages the bottom edge or chime 90 of each vessel 91 (see Fig. 3) in turn, thereby imparting a rotational motion to it as indicated in Fig. 5. The vessel revolves in situ by virtue of the stop members 51 and the guides 33, 34, 35, and 36. While thus revolving on the turntable the coating material is sprayed upon the outer surface of the vessel from the spray nozzles 80, 81, 82, 83, and 84, of which nozzle 80 is arranged to spray-coat the top of the vessel, 84 the bottom, and 81 to 83, inclusive, the side of the vessel.

After the desired thickness of coating material is deposited upon the surface of the vessel the stops 51 are lowered and 49 is swung out of the way by moving the piston rod 64 outwardly from the differential motor 63 a sufficient distance.

The vessel on the turntable is thus permitted to move off onto conveyor 2, as indicated by 92, and another vessel from conveyor 1 allowed to move onto turntable 3. The stops 48 and 51 are raised and spraying is repeated as before. Thus each vessel of a continuous series of vessels may be coated.

Among the advantages of the invention are that fully loaded vessels may be completely covered externally with a paint or varnish or the like with greatly reduced expenditure of labor, and a more uniform coating is obtained.

I claim:

1. An apparatus for spray-coating the outer surface of a right cylindrical vessel which comprises in combination a turntable on which the vessel to be coated is supported, a loading conveyor means adjacent to the entrance of the turntable, an unloading conveyor adjacent to the exit of the turntable, said turntable comprising two parallel rows of rollers, the rollers in each row being arranged in parallel and tangent to the underside of a horizontal plane, each of said rows comprising three rollers, driving means connected to the middle roller of one of the rows of rollers, said driving means being adapted to revolve the said middle roller, the said middle roller having serrations along its face adapted to frictionally engage the lower edge of a vessel resting thereon and impart thereto rotational motion, and guide members at each side of the turntable adapted to prevent the vessel supported by the turntable from moving sidewise off the turntable.

2. An apparatus for spray-coating the outer surface of a right cylindrical vessel which comprises in combination a turntable on which the vessel to be coated is supported, a loading conveyor means adjacent to the entrance of the turntable, an unloading conveyor adjacent to the exit of the turntable, said turntable comprising two parallel rows of rollers, the rollers in each row being arranged in parallel and tangent to the underside of a horizontal plane, each of said rows comprising three rollers, driving means connected to the middle roller of one of the rows of rollers, said driving means being adapted to revolve the said middle roller, the said middle roller having serrations along its face adapted to frictionally engage the lower edge of a vessel resting thereon and impart thereto rotational motion, guide members at each side of the turntable adapted to prevent the vessel supported by the turntable from moving sidewise off the turntable, a pair of spaced apart stop members adjacent the unloading conveyor adapted to prevent a vessel on the turntable from moving the turntable to the unloading conveyor, a stop means adjacent to the entrance of the turntable adapted to prevent movement of a vessel from the loading conveyor onto the turntable, and means connecting the said stop members and stop means for simultaneously moving the stops out of the way of vessels to permit replacing of a vessel on the turntable with one from the loading conveyor means.

3. An apparatus for spray-coating the outer surface of a right cylindrical vessel which comprises in combination a turntable on which the vessel to be coated is supported, a loading conveyor means adjacent to the entrance of the turntable, an unloading conveyor adjacent to the exit of the turntable, said turntable comprising two parallel rows of rollers, the rollers in each row being arranged in parallel and tangent to the underside of a horizontal plane, each of said rows comprising three rollers, driving means connected to the middle roller of one of the rows of rollers, said driving means being adapted to revolve the said middle roller, the said middle roller having serrations along its face adapted to frictionally engage the lower edge of a vessel resting thereon and impart thereto rotational motion, guide members at each side of the turntable adapted to prevent the vessel supported by the turntable from moving sidewise off the turntable, a pair of spaced apart stop members adjacent the unloading conveyor adapted to prevent a vessel on the turntable from moving from the turntable to the unloading conveyor, a stop means adjacent to the entrance to the turntable adapted to prevent movement of a vessel from the loading conveyor onto the turntable, means connecting the said stop members and stop means for simultaneously moving the stops out of the way of vessels to permit replacing of a vessel on the turntable with one from the loading conveyor means, and spray nozzles adapted to direct a spray of a liquid coating material onto the external surface of a vessel while upon the turntable.

4. An apparatus for spray-coating the outer surface of a right cylindrical vessel which comprises in combination a turntable on which the vessel to be coated is supported, a loading conveyor means adjacent to the entrance of the turntable, an unloading conveyor adjacent to the exit of the turntable, said turntable comprising two parallel rows of rollers, the rollers in each row being arranged in parallel and tangent to the underside of a horizontal plane, each of said rows comprising three rollers, driving means connected to the middle roller of one of the rows of rollers, said driving means being adapted to revolve the said middle roller, the said middle roller having serrations along its face adapted to frictionally engage the lower edge of a vessel resting thereon and impart thereto rotational motion, guide members at each side of the turntable adapted to prevent the vessel supported by the turntable from moving sidewise off the turntable, a pair of spaced apart stop members adjacent the unloading conveyor adapted to prevent a vessel on the turntable from moving from the turntable onto the unloading conveyor, a stop means adjacent to the entrance to the turntable adapted to prevent movement of a vessel from the loading conveyor onto the turntable, means connecting the said stop members and stop means for simultaneously moving the stops out of the way of vessels to permit replacing of a vessel on the turntable with one from the loading conveyor means, spray nozzles adapted to direct a spray of a liquid coating material onto the external surface of a vessel while upon the turntable, and a chamber over the turntable, said chamber being open at both the entrance and the exit of the turntable and said chamber being adapted to form a housing for the vessel to be spray-coated.

WOODFORD SIDNEY CHENAULT.

REFERENCES CITED

The following references are of record in the file of this patent:

UNITED STATES PATENTS

| Number | Name | Date |
| --- | --- | --- |
| 1,700,697 | Draper | Jan. 29, 1929 |
| 1,742,393 | Hooper et al. | Jan. 7, 1930 |
| 2,275,437 | Hopkins | Mar. 10, 1942 |
| 2,287,356 | Newman | June 23, 1942 |
| 2,442,179 | Shanklin et al. | May 25, 1948 |